United States Patent
Napierala (10) Patent No.: US 7,626,984 B2
(45) Date of Patent: Dec. 1, 2009

(54) METHOD AND APPARATUS FOR PROVIDING CONGRUENT MULTICAST AND UNICAST ROUTING

(75) Inventor: Maria Napierala, Ocean, NJ (US)

(73) Assignee: AT&T Corp., New York, NY (US)

( * ) Notice: Subject to any disclaimer, the term of this patent is extended or adjusted under 35 U.S.C. 154(b) by 450 days.

(21) Appl. No.: 11/586,149

(22) Filed: Oct. 25, 2006

(65) Prior Publication Data

US 2008/0101360 A1 May 1, 2008

(51) Int. Cl.
*H04L 12/28* (2006.01)
(52) U.S. Cl. .................. 370/389; 370/401; 709/238
(58) Field of Classification Search .............. 370/389, 370/432, 392, 401; 709/238, 242
See application file for complete search history.

(56) References Cited

U.S. PATENT DOCUMENTS

| | | | |
|---|---|---|---|
| 2004/0100983 A1* | 5/2004 | Suzuki | 370/432 |
| 2006/0159091 A1* | 7/2006 | Boers et al. | 370/390 |
| 2006/0159092 A1* | 7/2006 | Boers et al. | 370/390 |
| 2006/0221975 A1* | 10/2006 | Lo et al. | 370/395.5 |
| 2007/0091827 A1* | 4/2007 | Boers et al. | 370/255 |
| 2007/0104194 A1* | 5/2007 | Wijnands et al. | 370/390 |
| 2007/0147372 A1* | 6/2007 | Liu et al. | 370/390 |
| 2007/0177525 A1* | 8/2007 | Wijnands et al. | 370/254 |
| 2008/0056254 A1* | 3/2008 | Sridhar et al. | 370/390 |
| 2008/0089330 A1* | 4/2008 | Ballantyne | 370/390 |
| 2008/0095183 A1* | 4/2008 | Bijwaard et al. | 370/432 |

* cited by examiner

*Primary Examiner*—Bob A Phunkulh (57) ABSTRACT

A method and apparatus for enabling congruent multicast and unicast routing in a Virtual Private Network (VPN) are disclosed. For example, the present method receives a request to join a multicast group to receive multicast data traffic by a receiver behind a remote Provider Edge (PE) router. The method then discovers a multicast source to allow said remote PE router to use a direct path to receive said multicast data traffic from a source.

14 Claims, 5 Drawing Sheets

METHOD AND APPARATUS FOR PROVIDING CONGRUENT MULTICAST AND UNICAST ROUTING

The present invention relates generally to communication networks and, more particularly, to a method and apparatus for enabling congruent multicast and unicast routing in communication networks, e.g., in Multi-Protocol Label Switching/Border Gateway Protocol (MPLS/BGP) multicast Virtual Private Network (VPN).

BACKGROUND OF THE INVENTION

Various established deployments as well as new proposals for MPLS/BGP multicast VPN are not aware of the underlying unicast routing policy in multicast enabled VPN. The existing solutions and even new proposals do not take into account that different VPN sites might require different routing policies. As a consequence, VPN hosts might receive duplicated, unsolicited or unwanted multicast traffic. Multicast traffic from a source, S, to a multicast receiver group, G, should not be sent to multicast Virtual Routing and Forwarding (VRF) that has not "joined" the tunnel announced by a next hop towards S.

Therefore, a need exists for a method for enabling congruent multicast and unicast routing in a Multi-Protocol Label Switching/Border Gateway Protocol (MPLS/BGP) multicast Virtual Private Network (VPN).

SUMMARY OF THE INVENTION

In one embodiment, a method and apparatus for enabling congruent multicast and unicast routing in a Virtual Private Network (VPN) are disclosed. For example, the present method receives a request to join a multicast group to receive multicast data traffic by a receiver behind a remote Provider Edge (PE) router. The method then discovers a multicast source to allow said remote PE router to use a direct path to receive said multicast data traffic from a source.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

To better understand the present invention, a few terms will be defined prior to the disclosure of the present invention. A VRF is a technology used in computer networks that allows multiple instances of routing table to co-exist within the same router at the same time. A VPN is a private communications network often used to enable secure and confidential communications over a public network. The term "multicast" refers to the delivery of information from a specific source to a group of specific destinations simultaneously, and the term "unicast" refers to the delivery of information from a specific source to a single specific destination. A MPLS/BGP VPN is a communication network that combines enhanced BGP signaling and MPLS traffic segregation and router support for VRF to create a virtual private network. The BGP is a routing protocol of the Internet. MPLS is a protocol that uses label switching in conjunction with network layer routing.

In brief, the present invention enables the announcement of a tunnel for multicast VPN group, G, only if a source for S has been discovered. Only a VRF with a receiver for G attached to it knows its current best next hop to a source, S, of G. The best next hop to the source S might be different in different VRF of the same VPN since those different VRF can have different unicast routing policies. To preserve these routing policies, the information about the tunnel to be used for group G traffic should be sent only when the source S of G has been discovered, e.g., when a Provide Edge (PE) router being the next hop to that source S learns about its existence. The active sources behind PE routers should be discovered by the PE router as soon as possible after they become active to minimize the amount of traffic that is lost, duplicated, or misrouted. Different embodiments for source discovery will be described below. A PE router can itself discover the source attached to it or it can learn about it from another PE router in a multicast VPN. The present invention comprises various embodiments of the source discovery methods on how to discover active sources and whether source discovery information has to be exchanged between PE routers in a multicast VPN to enable congruent multicast and unicast routing policy. A PE router is a router that is deployed at the edge of the service provider network between the service provider network and another network managed by a customer or another service provider.

Figure 1:
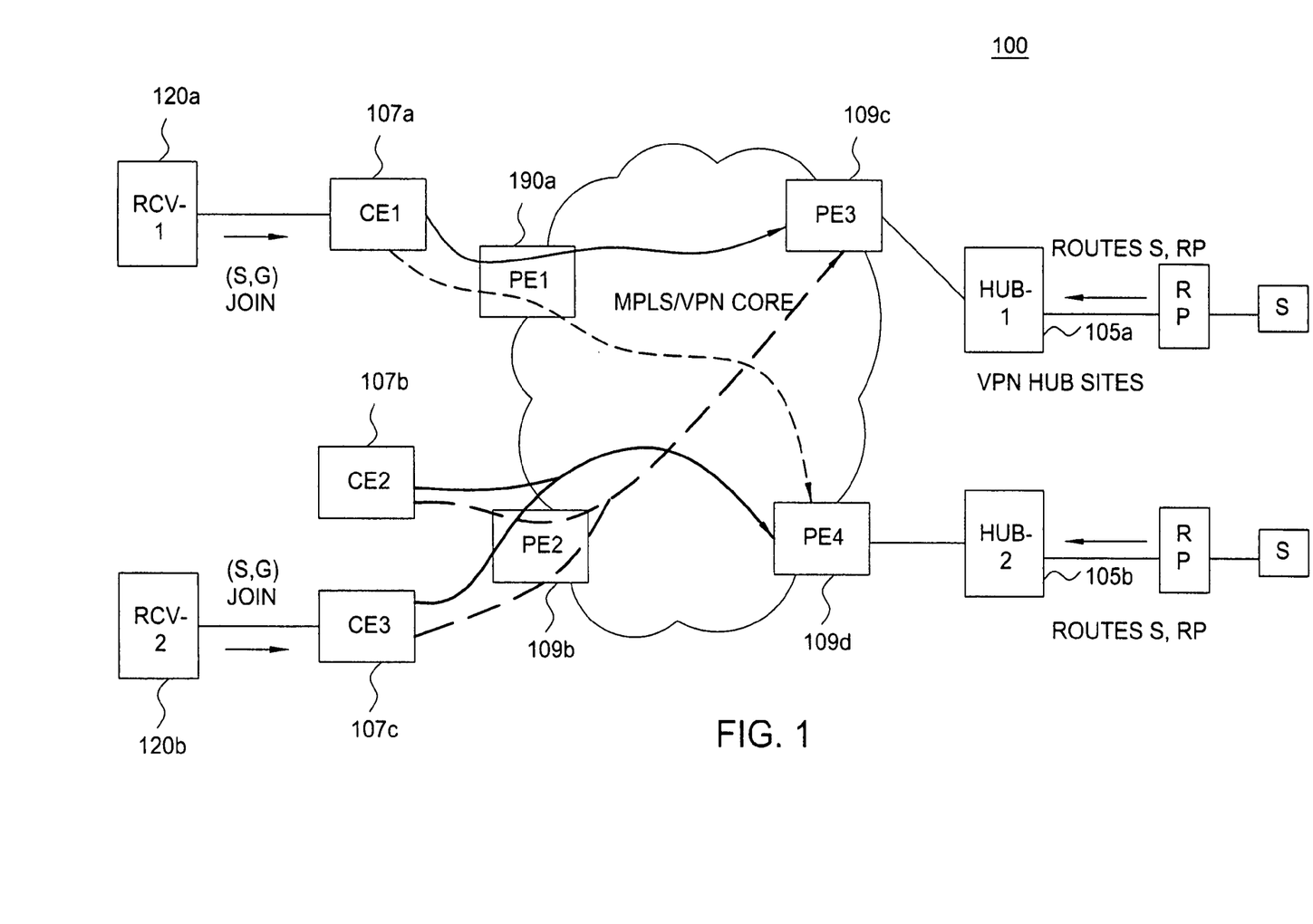
FIG. 1 illustrates an example of multicast unicast routing policy congruency in a communication network related to the present invention.

To better understand the present invention, FIG. 1 illustrates an example of multicast unicast routing policy congruency in a communication network 100 related to the present invention. FIG. 1 depicts that multicasting enables VPN that advertises the same route S (which is a source of multicast traffic) from two different Hub sites (Hub-1 105*a* and Hub-2 105*b*). This could be because of geographical partition of the VPN to different sub-regions being served by different hub sites or data centers. Those hub sites send the same routes to the VPN and expect the remotes, such as Customer Edge (CE) routers 107*a-c*, to send and receive traffic to and from their corresponding hub. All traffic from remotes, CE2 107*b* and CE3 107*c*, destined to destination S will follow a path via PE4 109*d*. If the path through PE4 is not available, the traffic will follow a path via PE3 109*c*. All traffic from remote CE1 107*a* destined to the same destination S will follow a path via PE3 and if this path is not available it will follow a path via PE4 109*d* as a backup. If sources S at both hub sites are sending traffic to group G, in the current MPLS/BGP multicast VPN implementation, both receivers Receiver 1 (Rcv-1) 120*a* and Receiver 2 (Rcv-2) 120*b* will receive the traffic from both hubs over the Default Multicast Distribution Tree (MDT) or Data Multicast Distribution Tree. Yet, Rcv-1 120*a* should receive the (S, G) traffic only from Hub-1 105*a* (if reachable) and Rcv-2 120*b* should receive the (S,G) traffic only from Hub-2 105*b* (if reachable). Only in the case of a hub failure, e.g., Hub-1 becomes unavailable, Rcv-1 can receive multicast traffic from Hub-2.

It should be noted that a CE router is a router that is deployed at the edge of a customer network that interfaces directly with a service provider network, typically with a service provider Provider Edge (PE) router. A Default MDT is a non-source-specific multicast distribution tree created statically to connect all PE routers in a VPN. A Data MDT is a source-specific multicast distribution tree created dynamically to connect only the interested PE routers in a VPN. The notation (S, G) denotes the protocol state that maintains a source-specific tree for source S and group G. The (S, G) protocol state is one of the Tree Information Base (TIB) protocol states specified in the Protocol Independent Multicast (PIM) protocol specification. The (S,G) Join message is a PIM protocol message that is used for joining a multicast group G with specified source S. Protocol-Independent Multicast (PIM) is a family of multicast routing protocols that can provide one-to-many and many-to-many distribution of data over a communication network, e.g., an Internet Protocol (IP) network. A TIB is a collection of state at a PIM router that stores the state of all multicast distribution trees at the PIM router.

Depending on source discovery technique used for solving multicast and unicast routing congruency, its byproduct is that the active sources become known not only to PE routers with sources behind them but also to PE routers with receivers behind them. This knowledge can be used to eliminate the Rendezvous Point Tree (RPT), also known as a shared tree, to Shortest Path Tree (SPT) switchover in multicast VPN context. This is because shared tree are never built across the multicast VPN service provider infrastructure. In order to eliminate RPT to SPT switchover, Protocol Independent Multicast (PIM) control procedures in multicast VPN context need to be modified. Depending on the source discovery technique used, the PIM messages associated with shared trees can be completely or partially eliminated in multicast VPN context.

A Rendezvous Point (RP) is a router that has been configured to be used as the root of a non-source-specific distribution tree for a multicast group. PIM Join messages from receivers for a group G are sent towards the RP, and data from sources are sent to the RP so that receivers can discover who the sources are and start to receive traffic destined for the group G. An RPT, or a shared tree, is a non-source-specific multicast distribution tree with its root at a RP. The terms RPT and shared tree are used interchangeably throughout the document. Note that a Default MDT is one specific implementation of the RPT. A SPT is a source-specific multicast distribution tree that provides more optimal routing, e.g., in terms of the number of hops or latency, than the RPT. Note that a Data MDT is one specific implementation of the SPT.

In native IP multicast in the Any-Source Multicast (ASM) mode, the only purpose of shared trees is for multicast hosts to discover the sources of multicast traffic they are interested in. The PIM ASM procedures refer to the set of procedures specified in the PIM Sparse Mode specification that uses a Rendezvous Point (RP) to support multicast routing. Multicast source discovery in the ASM mode is achieved without flooding but at the cost of a considerable amount of complexity. Switching from shared tree to SPT in the ASM mode usually occurs as soon as a receiver discovers a source, typically on the receipt of the first packet from the source. The RPT-to-SPT switchover involves many specialized control states like (*,G), (S,G), (S,G,rpt) which are associated with each other. ASM procedures are very mature and have been running over enterprise networks for many years. PIM Sparse Mode (PIM-SM) in the Source Specific Multicast (SSM) mode is much simpler than PIM-SM in the Any-Source Multicast (ASM) mode.

Only the multicast VRF with a receiver for a group G behind it has the information about the current best next hop to a source S of G. Hence, only the receiver-initiated tunnel creation can preserve unicast routing policy of the VRF without a need for a tunnel announcement technique. The best next hop to the source S might be different in different VRF of the same VPN and different VRF of the same VPN can have different unicast routing policies. To preserve the routing policies, the tunnel initiation has to happen after source S of G has been discovered, e.g., when a PE router being the next hop to that source learns about the source's existence.

An active source should be discovered by the multicast VPN Service Provider infrastructure as soon as possible. Namely, the active sources should be discovered by the PE router as soon as possible after they become active so the amount of traffic that is lost, duplicated, or misrouted is negligible.

Different methods for source discovery exist. A PE router can itself discover the sources attached to it or it can learn this from another PE router in a multicast VPN. Source discovery methods differ in how quickly they discover active sources, whether source discovery information has to be exchanged between PE routers in the multicast VPN, and whether the discovery method requires exchanging of control information with VPN Rendezvous Points (RP).

There are several principles that should be followed with regard to the MPLS/BGP multicast VPN control plane:
  Maintaining the congruency of multicast routing policy with unicast routing policy. This requires that the tunnel information should not be signaled before sources are known or discovered. Specifically, signaling of tunnel information upon the source sending traffic natively on the (S,G) distribution tree is not sufficient since it might lead to a non-negligible amount of duplicate, unsolicited or unwanted traffic being sent to receivers.
  Providing an out-of-band mechanism that will allow constrained distribution of tunnel information, constrained distribution of information about active sources, and constrained distribution of customer multicast control messages for bypassing inter-site shared trees of multicast VPN is needed. In one embodiment, out-of-band mechanism, or signaling, refers to the transmission of control traffic that is independent from the transmission of data traffic, e.g., the use different and independent protocols to transmit control traffic and data traffic.
  Simplifying multicast VPN implementation in the service provider infrastructure from the ASM procedures. The amount of customer multicast control messages carried across SP network should be minimized. Inter-site multicast traffic should not be sent over shared trees, and the end result is simply the SPT. This can be accomplished by modifying PIM protocol in multicast VPN context to perform only the necessary routing exchanges.
  Simplifying or reducing inter-site multicast VPN routing information should not require multicast protocol, e.g. PIM protocol, changes in the customer domain.
  There should be no shifts of traffic in the Service Provider network of multicast VPN traffic to assure stability of traffic patterns. Specifically, there should be no switching of traffic between RPT and SPT within SP network or between different tunnels in SP network.

In the present invention, there are various embodiments on how to discover an active source of multicast traffic in a multicast VPN. In general, an active source can be discovered when:
  a PE router with a customer RP (C-RP) behind receives the first (*,C-G) packet from a customer source C-S; or when a PE router receives the first (C-S,C-G) join from either, directly connected CE or another PE in a multicast VPN.

Figure 4:
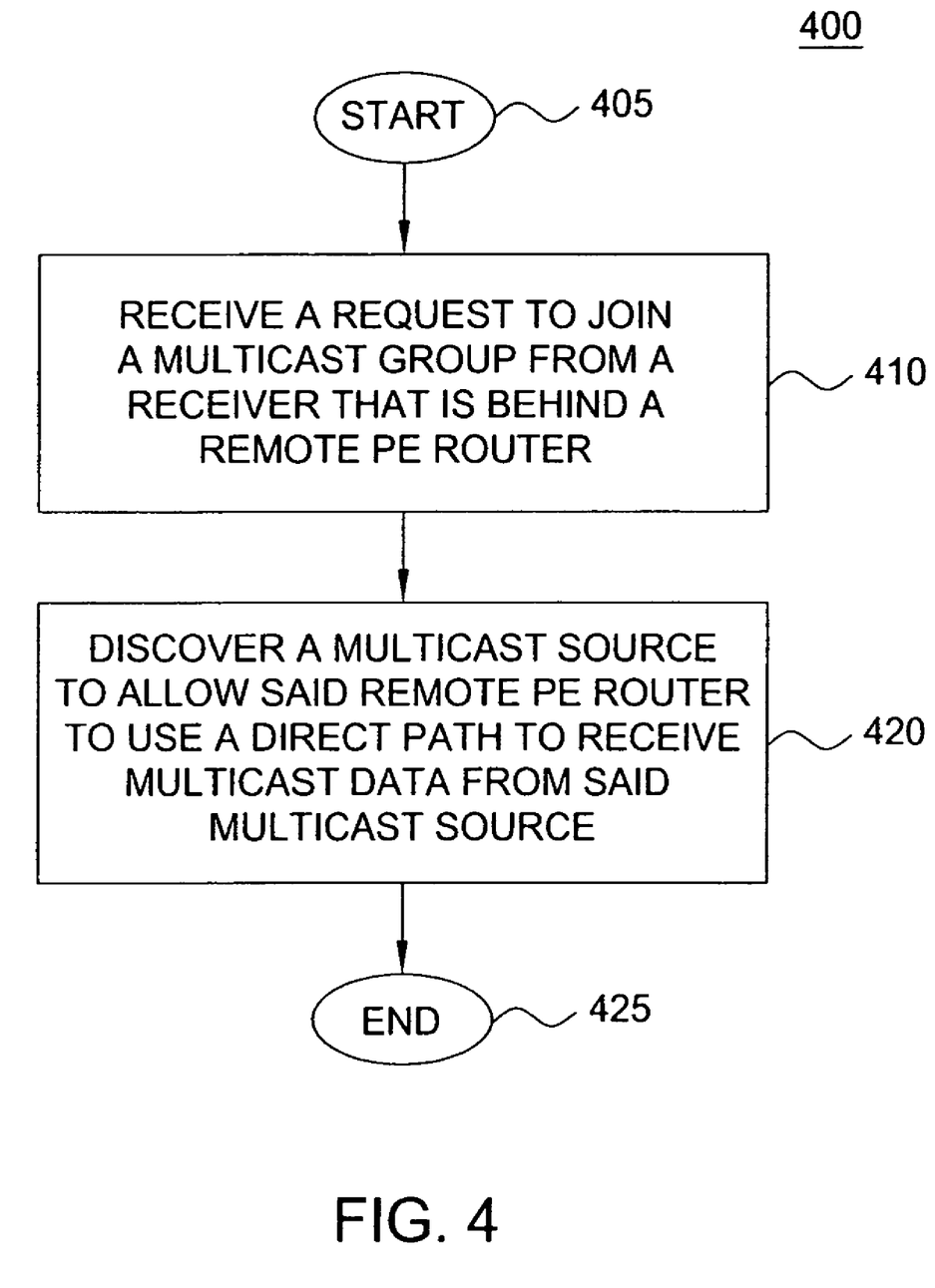
FIG. 4 illustrates a source discovery method related to the present invention.

FIG. 4 illustrates a source discovery method 400 related to the present invention. Method 400 starts in step 405 and proceeds to step 410.

In step 410, method 400 receives a request to join a multicast group from a receiver that is behind a remote PE router. For example, the receiver can be an endpoint device that is used by a user to obtain the multicast data.

In step 420, method 400 discovers a multicast source to allow the remote PE router to use a direct path to receive multicast data from said multicast source. More specifically, the multicast source is discovered in a manner that provides congruent multicast and unicast routing. Method 400 ends in step 425.

It should be noted that the present invention provides a plurality of different methods to implement the discovery of a multicast source. These various methods are further described using the illustrative networks as shown below in FIGS. 2-3. It should be noted that although FIGS. 2-3 are not specifically shown as flowcharts, those skilled in the art will readily understand that the described steps in view of the illustrative networks constitute steps of methods for discovering a multicast source.

Note that all the terms described herein with a "C-" prefix signifies these terms refer to an entity located within or associated with a customer domain outside of a service provider domain. For instance, C-S denotes a source located in a customer domain, a C-RP denotes a RP in a customer domain, and C-G denotes a multicast G associated with a customer domain.

Figure 2:
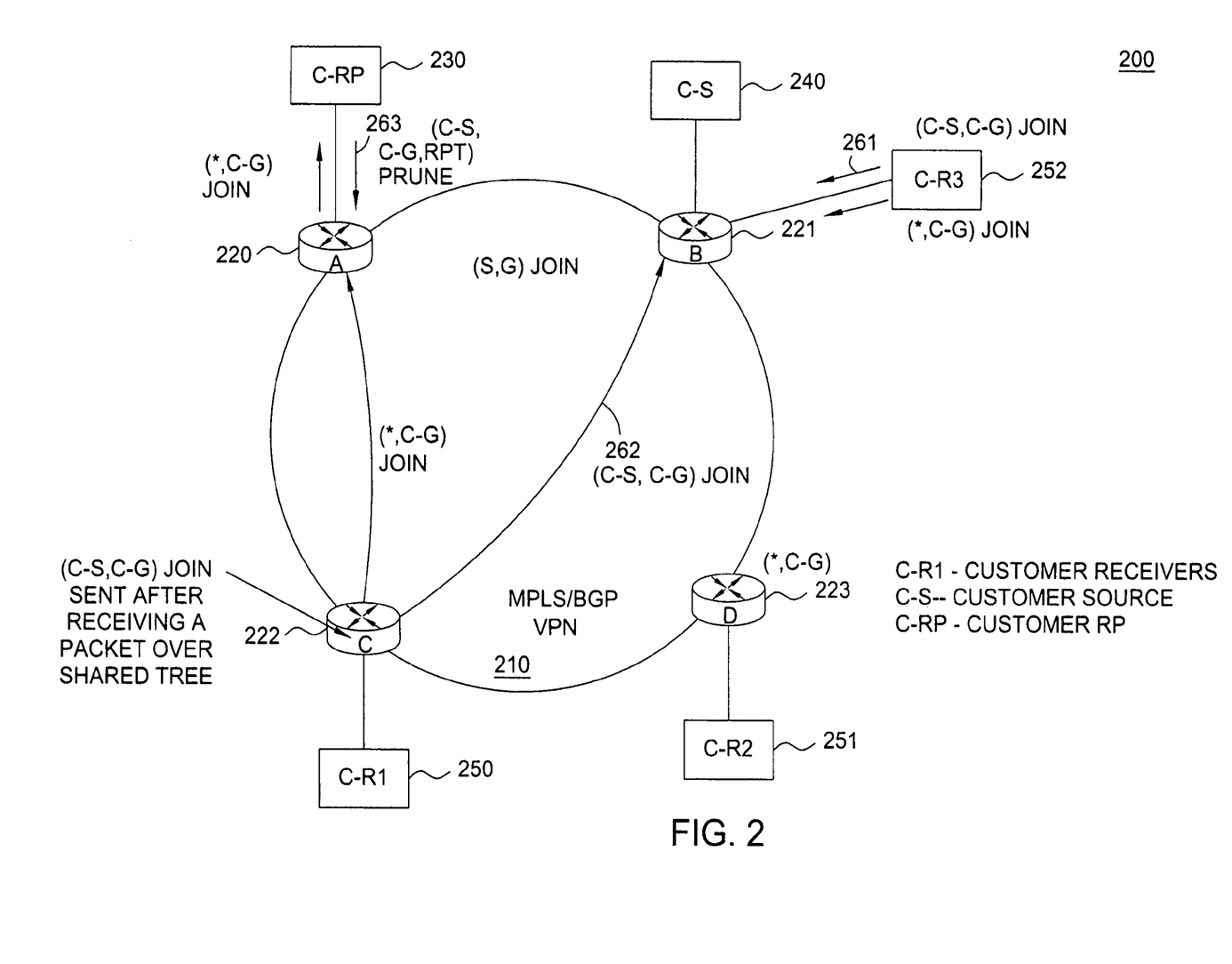
FIG. 2 illustrates the first embodiment of the source discovery method related to the present invention.
Figure 3:
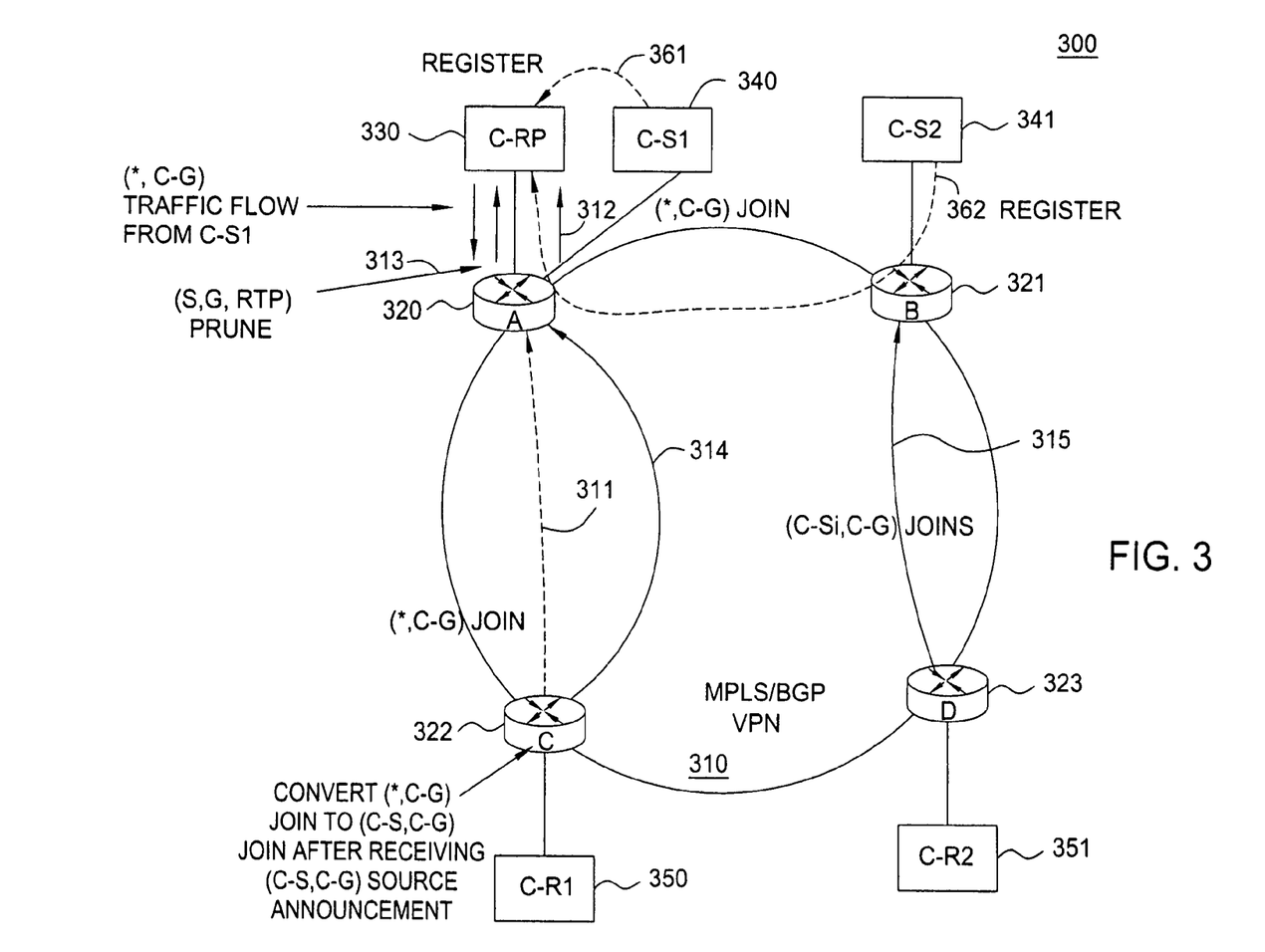
FIG. 3 illustrates the second embodiment of the source discovery method related to the present invention.

FIG. 2 illustrates the first embodiment of the source discovery method 200 related to the present invention. For example, the service provider MPLS/BGP VPN infrastructure 210 may comprise a plurality of PE routers: PE A 220, PE B 221, PE C 222, and PE D 223. Customer RP (C-RP) 230 is situated behind PE A, customer source C-S 240 is situated behind PE B, customer receiver 1 (C-R1) 250 is situated behind PE C, customer receiver 2 (C-R2) 251 is situated behind PE D, and customer receiver 3 (C-R3) 252 is situated behind PE B. In the first embodiment, when a PE router 221 with a multicast source behind it, such as PE B in FIG. 2, receives the first (C-S,C-G) Join message from a locally connected CE, such as from C-R3 shown as event 261, or from a remote PE router, such as PE C (shown as event 262) and PE D or even PE A in FIG. 2, PE B will announce the tunnel to be used for (C-S,C-G) multicast traffic to all other PE routers in the multicast VPN. PE C and PE D will join the tunnel for (C-S,C-G) announced by PE B only if PE B is its best next hop router to the source S. A PE with either (C-S,C-G) or (*,C-G) state will join the tunnel announced for (C-S,C-G). Hence, the receivers of C-G that have not switched to SPT, such as C-R2 in FIG. 2, will also receive the traffic directly from the active sources and not from the active sources via C-RP.

In this embodiment, each PE that have a C-RP behind it (i.e., the incoming interface for (*,C-G) state is a PE to CE interface such as PE A to C-RP in FIG. 2) will send a (C-S, C-G,rpt) Prune message, shown as event 263, for all active sources of group C-G. This is to shut off active source traffic of the shared tree and hence make a PE with a source behind it a forwarder of this source traffic. In FIG. 2, PE A is such a PE.

This embodiment cannot block PIM (*,C-G) control or initial (*,C-G) data traffic between PE routers in the multicast VPN. Also, it does not eliminate RPT to SPT switching in multicast VPN context. A few initial packets received by receivers could be duplicates. This first embodiment preserves congruency of multicast routing with unicast routing policy because it allows the PE routers with receivers to join the correct tunnel for (C-S,C-G) traffic. It also avoids switching of multicast traffic between multicast VPN tunnels (except the few initial packets).

FIG. 3 illustrates the second embodiment of the source discovery method 300 related to the present invention. For example, a service provider MPLS/BGP VPN infrastructure 310 may comprise a plurality of PE routers: PE A 320, PE B 321, PE C 322, PE D 323. A customer RP (C-RP) 330 is situated behind PE A, customer source C-S1 340 is also situated behind PE A, customer source C-S2 341 is situated behind PE B, customer receiver 1 (C-R1) 350 is situated behind PE C, and customer receiver 2 (C-R2) 351 is situated behind PE D. In the second embodiment, upon a PE router with a C-RP for group C-G behind it, such as PE A in FIG. 3, receiving an out-of-band PIM (*,C-G) Join message, shown as event 311, from a remote PE router, such as PE C in FIG. 3, the PE router with C-RP behind it will send the PIM (*,C-G) Join message towards the C-RP and it will add an interface that leads toward the MPLG/BGP VPN network to the (*, C-G) outgoing interface list in the multicast VRF.

In the meantime, VPN source C-S1 or source C-S2 has sent a PIM Register message, with encapsulated multicast data in it, to the C-RP via PE A from C-S2, shown as event 362, or directly outside of the WAN MPLS/BGP VPN network from C-S2, shown as event 361, respectively. The C-RP decapsulates the multicast data packet from the Register message and sends it over the (*,C-G) shared tree. Note that a Register message is a message sent by the source C-S1 or source CS-2 to the C-RP with the data traffic destined to all receivers in group G encapsulated within this message. When PE A receives the first multicast packet from the source C-Si in FIG. 3, where i=1 or 2, over the (*,C-G) tree, shown as event 312, it sends a (C-Si,C-G,rpt) Prune message, shown as event 313, to the C-RP and announces the active source C-Si and its location, being behind PE A or PE B, to all PE routers in the multicast VPN. This requires PE A to snoop for a packet received on (*,C-G) and to extract from it the source address. However, instead of sending (C-S, C-G) Join as in the normal ASM procedures, PE A sends an announcement message about the active source C-Si to all other PE's in this multicast VPN. The sending of the (C-Si,C-G,rpt) Prune message towards C-RP stops the multicast traffic originated from C-Si on the shared (*,C-G) shared tree.

Once a PE with source C-Si behind it, such as PE A or PE B in FIG. 3, learns about the existence of this source either from another PE or by itself, it will announce to all PE routers in this multicast VPN the tunnel ID to be used for (C-S,C-G) traffic. Upon the PE routers with receivers of group C-G behind them, such as PE C and PE D in FIG. 3, receiving the tunnel information for (C-S,C-G), these PE routers will join the correct tunnel and will translate or convert PIM (*,C-G) Join/Prune messages to PIM (C-S,C-G) Join/Prune inter-PE messages in multicast VPN context and send the PIM (C-S, C-G) Join/Prune messages toward PE A and PE B, shown as events 314 and 315 respectively. Each PE with receivers of C-G behind it will send a (C-Si, C-G) Join message to the best next hop to the source C-Si and it will join the tunnel for (C-Si, C-G) announced by this best next hop. However, the PE with C-RP behind it, such as PE A in FIG. 3, will not forward any (*, C-G) traffic on the interface leading to MPLS/ BGP VPN network. This interface serves solely the purpose of keeping (*, C-G) outgoing interface list non-empty. In order not to change the PIM procedures in the customer domain, the PIM (*,C-G) Join/Prune messages are also being propagated across the sites of the multicast VPN.

This embodiment does not eliminate PIM (*,C-G) Joins/Prune messages carried from a PE router to another PE router but blocks all (*,C-G) data traffic between PE routers in the multicast VPN. Hence, it eliminates inter-site RPT to SPT multicast traffic switching. It also eliminates inter-site PIM (C-S,C-G,rpt) Prune messages. The initial packets sent by the sources will be dropped. PE to PE data traffic in the multicast VPN context the traffic is sent only on SPT.

The second embodiment needs to address a scenario where a dual-homed VPN site chooses a different next-hop PE depending on whether a shared (*,C-G) tree or source (C-S,C-G) tree is joined. It means that shared tree and SPT diverge at this site. A PE on the shared tree will receive (C-S,C-G, rtp) Prune message from directly connected CE. In this case, to avoid duplicate traffic from C-S, this PE will send (C-S,C-G) Prune towards interface leading to the backbone network. However, it does not need to propagate (C-S,C-G, rtp) Prune (if C-RP is at a remote PE) since C-S has be already pruned from the shared tree.

Both, first and second embodiments of the present invention, do not introduce any requirements or restrictions on the multicast VPN service offering. They both work with any multicast topology and with any RP protocol in customer domain. The better among those two embodiments is the first one because it eliminates switching of inter-site multicast traffic between RPT and SPT and discovers sources no later than in plain ASM multicast.

There are other source discovery methods possible. However, they either require changes in multicast procedures in customer network or they introduce specific requirements in how Multicast VPN service is offered. For example, PE could participate in PIM source discovery techniques in the customer domain. This requires one or more (for redundancy) PEs to act as customer RPs or MSDP peers to customer RP. This technique completely eliminates inter-site PIM messages associated with shared trees and with RPT-to-SPT switching. However, it lays specific requirements on multicast VPN service offering and on the multicast design in the customer network. It either requires that multicast VPN customer is willing to outsource the RP functionality to the service provider (SP) or that customer RP establishes the MSDP peering with PE. Outsourcing the RP to service provider might not be desirable to neither, the customer and the SP. Also, it might not be feasible for the customer to run MSDP and for SP to support MSDP in multicast VPN context with every customer. Also, the RP assignment gets complicated if customer is using dynamic RP protocol (Auto-RP or BSR). Because of these reasons this might not be a valid source discovery option. MSDP is a computer network protocol in the Protocol Independent Multicast (PIM) family of multicast routing protocols that enables Rendezvous Point (RP) redundancy and interdomain multicasting. MSDP specification is published by the Internet Engineering Task Force (IETF).

If a multicast VPN is implemented according to the draft-rosen-vpn-mcast specification, source discovery allows Default MDT to be used only for control traffic. No multicast data traffic needs to be sent over Default MDT unless desired for other reasons like state optimization. No switching of multicast traffic from Default to Data MDT would be required. Note that the draft-rosen-vpn-mcast specification and the draft-ietf-l3vpn-2547bis-mcast specification are documents published by the Internet Engineering Task Force (IETF) addressing multicast VPN.

Data MDT would be announced upon source discovery and not upon the source sending traffic natively on (S,G). Information about the active sources could be distributed among PE routers in Data MDT-like User Datagram Protocol (UDP) message format except that instead of Group/Tunnel address, the message should include IP address of a PE router which is the BGP next hop router to the source. This message would be distributed over Default MDT. UDP is one of the core protocols of the Internet protocol suite that uses datagrams to transport messages between networked computers.

Data MDT procedure in the draft-rosen-vpn-mcast specification needs to be modified as follows. When a source is discovered using one of the embodiments of the present invention, PE router, e.g., PE S, with source S for group G behind it sends MDT Join Type-Length-Value (TLV). The MDT Join TLV is forwarded and sent periodically as described in the draft-rosen-vpn-mcast specification, to all the PE routers in the multicast VPN. In data communication protocols, protocol information can be encoded as a type-length-value sequence. Only those PE routers that have received MDT Join TLV will join the Data MDT group if the two following conditions are met:
  These PE routers have interested receivers for group G or for (S,G); and
  whose next hop to the source S is the same as IP address used in the IP packet advertising the MDT Join TLV (i.e., whose next hop to the source S is the PE announcing Data MDT Join).

PE routers which are not connected to receivers in group G will cache Data MDT message in order to reduce the delay when a receiver comes up in the future or in case of a primary route failure towards a source. If the MDT Join TLV is not received over a predefined timeout period, the PE routers connected to the receivers just leave the Data MDT group in the global instance. This means that the source S has stopped sending traffic.

No delay would be needed in the PE router with the source behind to start encapsulating traffic using the Data MDT group. The traffic received from the source S of group G over the (S,G) distribution tree would be immediately sent over Data MDT as long as there is at least one receiver for (S,G). Any pre-configured conditions, such as bandwidth, are no longer required to start announcing Data MDT. Data MDT will be announced as soon as source S of group G is discovered.

The functionality provided by multicast PE to PE signaling in MPLS/BGP VPN architecture comprises the following:
  exchange of VPN multicast routing information;
  signaling of active sources in a VPN; and
  signaling of tunnel information to be used for multicast VPN traffic across the SP network.

Several protocols could be used for enabling multicast PE to PE signaling to exchange MPLS/BGP VPN multicast routing between PE routers including:
  PIM;
  Multicast Label Distribution Protocol (MLDP); and
  BGP with extensions.

MPLS/BGP VPN Multicast Control Plane consists of signaling of active VPN Sources, signaling of Tunnel information, and of exchanging VPN Multicast Routing information among PE routers. The tunnel instantiation could be a part of the multicast VPN discovery phase, a separate phase after discovery, or as needed depending on traffic characteristics.

As was pointed out above, the tunnels to be used for sending multicast (S,G) traffic in multicast VPN should not be instantiated either before source of this traffic is discovered or after a source sends traffic natively on (S,G). Instantiating tunnels after a source sends traffic natively on (S,G) does not meet the traffic negligibility requirement, i.e., that only an negligible amount of the initial multicast VPN traffic can be dropped or duplicated or misrouted. Also, there should be no switching of VPN multicast traffic between tunnels in a service provider network.

The tunnels could be receiver or sender initiated. As is pointed out above, only the receiver initiated tunnel creation can preserve VRF unicast routing policy without a need for a tunnel announcement technique.

In order to assure congruency of unicast and multicast routing as well as to simplify the inter-site multicast VPN operations, the existence of active sources in multicast VPN should be discovered before the tunnels for sources are signaled. The two different embodiments of the present invention for source discovery have been described above.

Once the active sources are discovered, PE routers participating in a multicast VPN should announce those sources to each other using some signaling method. With each active source, the identity of the tunnel to be used for this source should be also sent. This tunnel can use the existing Data MDT construct with modifications of Data MDT operations as described previously or if tunnel techniques other than the Generic Routing Encapsulation (GRE) encapsulation are supported, then their corresponding multicast route propagation method will be used, e.g., BGP extensions, to propagate the identity of the tunnel for (S,G) traffic. GRE is a tunneling protocol designed for encapsulation of arbitrary kinds of network layer packets inside arbitrary kinds of network layer packets.

In Multicast Label Distribution Protocol (MLDP) as multicast VPN distribution method, RPT-to-SPT switching is complex in the MPLS network because packets are forwarded using labels and there is no multicast state in the core. To solve this problem an out-of-band-signaling can be used to track (*,G) Join/Prune and (S,G,rpt) Prune messages. As was pointed out in this document, one of the principles of MVPN implementation should be simplification of the inter-PE ASM procedure. Since MLDP already requires out-of-band tracking of shared trees to support PIM-SM, the inter-PE shared (*,G) trees should be bypassed and only SPT (S,G) trees should be built across SP network. This would result in no inter-site RPT-to-SPT traffic switching. Also, to avoid carrying the periodic refresh of PIM Join/Prunes in MLDP, all PIM messages could be carried out-of-band while MLDP would react only to new routing events (new PIM Joins or Prunes). Note that MLDP is a protocol in which two label-switched routers (LSR) exchange label mapping information in a multicast MPLS/BGP network.

The following two signaling options for Source Announcement could be considered for implementation:

BGP; or

UDP.

A UDP message to signal active sources could be a Data MDT-like message except that instead of Group/Tunnel address that message would include IP address of a PE which is BGP next hop to the source. This message could be signaled over Default MDT.

The following two signaling options for Tunnel Announcement could be considered for implementation:

UDP; or

BGP.

The signaling of tunnel information, in general, is not required when Multicast Label Distribution Protocol (MLDP) is used as control/data plane but it is necessary if tunnel aggregation is to be supported. MLDP is a protocol in which two label-switched routers (LSR) exchange label mapping information in a multicast MPLS/BGP network.

Figure 5:
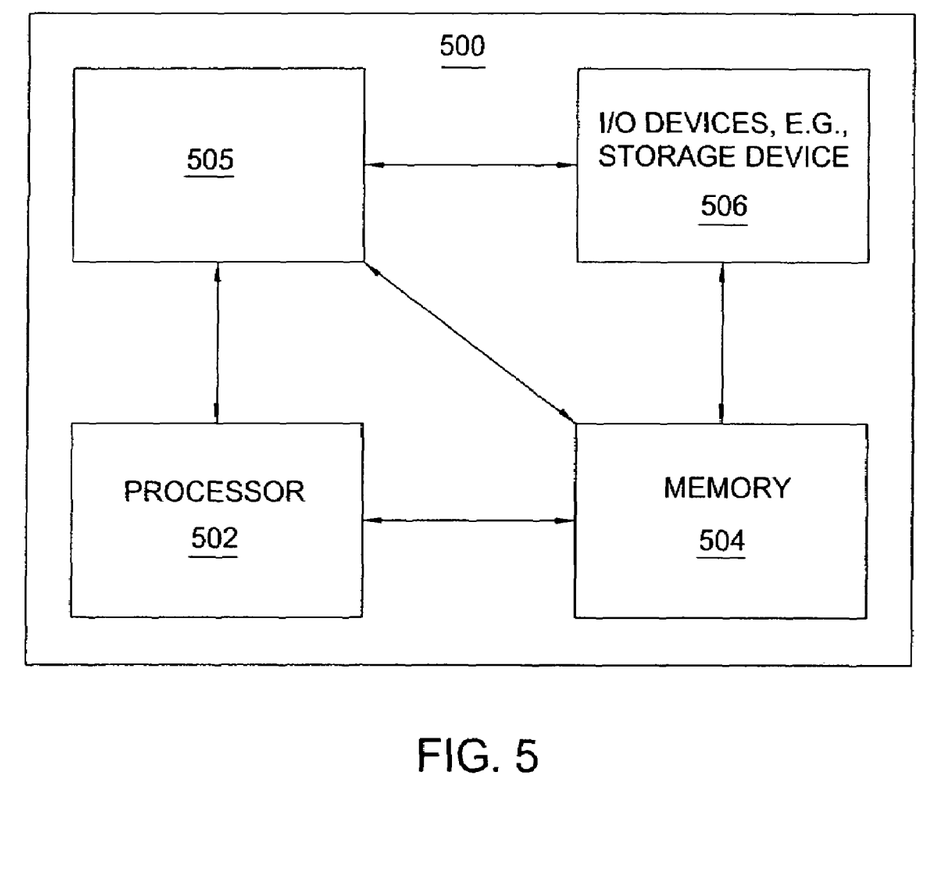
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for enabling congruent multicast and unicast routing, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for enabling congruent multicast and unicast routing can be loaded into memory 504 and executed by processor 502 to implement the functions as discussed above. As such, the present process 505 for enabling congruent multicast and unicast routing (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for enabling congruent multicast and unicast routing in a Virtual Private Network (VPN), comprising:

receiving a request to join a multicast group to receive multicast data traffic from a receiver behind a remote Provider Edge (PE) router or a locally connected Customer Edge (CE) router; and discovering a multicast source to allow said remote PE router or said locally connected CE router to use a direct path to receive said multicast data traffic from a source, wherein said VPN is a Multi-Protocol Label Switching/Border Gateway Protocol (MPLS/BGP) multicast VPN, wherein said discovering comprises:

receiving a PIM (*,G) Join message by a Provider Edge (PE) router with a Customer Rendezvous Point (C-RP) behind said PE router from said remote PE router, where G is a multicast group;

sending said received PIM (*,G) Join message by said PE router with said C-RP behind said PE router to said C-RP without forwarding multicast traffic on an interface that leads toward said VPN; and announcing said multicast source.

2. The method of claim 1, wherein said announcing comprises:

sending a PIM (S,G,rpt) Prune message by said PE router with a C-RP behind said PE router to said C-RP when a first multicast packet is received from said multicast source by said PE router with a C-RP behind said PE router, where S is a source of said multicast group;

sending a source announcement message by said PE router with a C-RP behind said PE router to indicate said multicast source and a location of said multicast source to all other PE routers in said VPN; and signaling an existence of said multicast source and a tunnel identifier to be used for (S,G) multicast traffic to said all other PE routers in said VPN by the PE router with said multicast source behind said PE router when said PE router with said multicast source behind said PE router receives said source announcement message from said PE router with a C-RP behind said PE router.

3. The method of claim 2, wherein said source announcement message comprises a source address of said first multicast packet extracted from said first multicast packet.

4. The method of claim 1, wherein said discovering further comprises:
translating a PIM (*,G) Join message to a PIM (S,G) Join message by each PE router with a multicast group G receiver behind said PE router; and
sending said PIM (S,G) Join message by said each PE router with a multicast group G receiver behind said PE router to a best next hop router towards said multicast source; and
joining a tunnel for a (S,G) distribution tree announced by said best next hop router.

5. A method for enabling congruent multicast and unicast routing in a Virtual Private Network (VPN), comprising:
receiving a request to join a multicast group to receive multicast data traffic from a receiver behind a remote Provider Edge (PE) router or a locally connected Customer Edge (CE) router; and
discovering a multicast source to allow said remote PE router or said locally connected CE router to use a direct path to receive said multicast data traffic from a source, wherein said VPN is a Multi-Protocol Label Switching/Border Gateway Protocol (MPLS/BGP) multicast VPN, wherein said discovering comprises:
receiving a first PIM (S,G) Join message by a Provider Edge (PE) router with a multicast source behind said PE router from said remote PE router or said locally connected CE router, where S is a multicast source and G is a multicast group;
announcing a tunnel to be used for (S,G) multicast traffic to all remote PE routers in said VPN by said PE router with said multicast source behind said PE router; and
joining the tunnel for a (S,G) distribution tree announced by said a remote PE router with a multicast group receiver behind said PE router only if said PE router with a multicast source behind said PE router is a best next hop router from said remote PE router to said multicast source.

6. A computer-readable medium having stored thereon a plurality of instructions, the plurality of instructions including instructions which, when executed by a processor, cause the processor to perform steps of a method for enabling congruent multicast and unicast routing in a Virtual Private Network (VPN), comprising:
receiving a request to join a multicast group to receive multicast data traffic from a receiver behind a remote Provider Edge (PE) router or a locally connected Customer Edge (CE) router; and
discovering a multicast source to allow said remote PE router or said locally connected CE router to use a direct path to receive said multicast data traffic from a source, wherein said VPN is a Multi-Protocol Label Switching/Border Gateway Protocol (MPLS/BGP) multicast VPN, wherein said discovering comprises:
receiving a PIM (*,G) Join message by a Provider Edge (PE) router with a Customer Rendezvous Point (C-RP) behind said PE router from said remote PE router, where G is a multicast group;
sending said received PIM (*,G) Join message by said PE router with said C-RP behind said PE router to said C-RP without forwarding multicast traffic on an interface that leads toward said VPN; and
announcing said multicast source.

7. The computer-readable medium of claim 6, wherein said announcing comprises:
sending a PIM (S,G,rpt) Prune message by said PE router with a C-RP behind said PE router to said C-RP when a first multicast packet is received from said multicast source by said PE router with a C-RP behind said PE router, where S is a source of said multicast group;
sending a source announcement message by said PE router with a C-RP behind said PE router to indicate said multicast source and a location of said multicast source to all other PE routers in said VPN; and
signaling an existence of said multicast source and a tunnel identifier to be used for (S,G) multicast traffic to said all other PE routers in said VPN by the PE router with said multicast source behind said PE router when said PE router with said multicast source behind said PE router receives said source announcement message from said PE router with a C-RP behind said PE router.

8. The computer-readable medium of claim 7, wherein said source announcement message comprises a source address of said first multicast packet extracted from said first multicast packet.

9. The computer-readable medium of claim 6, wherein said discovering further comprises:
translating a PIM (*,G) Join message to a PIM (S,G) Join message by each PE router with a multicast group G receiver behind said PE router; and
sending said PIM (S,G) Join message by said each PE router with a multicast group G receiver behind said PE router to a best next hop router towards said multicast source; and
joining a tunnel for a (S,G) distribution tree announced by said best next hop router.

10. A computer-readable medium having stored thereon a plurality of instructions, the plurality of instructions including instructions which, when executed by a processor, cause the processor to perform steps of a method for enabling congruent multicast and unicast routing in a Virtual Private Network (VPN), comprising:
receiving a request to join a multicast group to receive multicast data traffic from a receiver behind a remote Provider Edge (PE) router or a locally connected Customer Edge (CE) router; and
discovering a multicast source to allow said remote PE router or said locally connected CE router to use a direct path to receive said multicast data traffic from a source, wherein said VPN is a Multi-Protocol Label Switching/Border Gateway Protocol (MPLS/BGP) multicast VPN, wherein said discovering comprises:
receiving a first PIM (S,G) Join message by a Provider Edge (PE) router with a multicast source behind said PE router from said remote PE router or said locally connected CE router, where S is a multicast source and G is a multicast group;
announcing a tunnel to be used for (S,G) multicast traffic to all remote PE routers in said VPN by said PE router with said multicast source behind said PE router; and
joining the tunnel for a (S,G) distribution tree announced by said a remote PE router with a multicast group receiver behind said PE router only if said PE router with a multicast source behind said PE router is a best next hop router from said remote PE router to said multicast source.

11. An apparatus for enabling congruent multicast and unicast routing in a Virtual Private Network (VPN), comprising:

means for receiving a request to join a multicast group to receive multicast data traffic from a receiver behind a remote Provider Edge (PE) router or a locally connected Customer Edge (CE) router; and means for discovering a multicast source to allow said remote PE router or said locally connected CE router to use a direct path to receive said multicast data traffic from a source, wherein said VPN is a Multi-Protocol Label Switching/Border Gateway Protocol (MPLS/BGP) multicast VPN, wherein said discovering means comprises:

means for receiving a PIM (*,G) Join message by a Provider Edge (PE) router with a Customer Rendezvous Point (C-RP) behind said PE router from said remote PE router, where G is a multicast group;

means for sending said received PIM (*,G) Join message by said PE router with said C-RP behind said PE router to said C-RP without forwarding multicast traffic on an interface that leads toward said VPN; and means for announcing said multicast source.

12. The apparatus of claim 11, wherein said announcing means comprises:

means for sending a PIM (S,G,rpt) Prune message by said PE router with a C-RP behind said PE router to said C-RP when a first multicast packet is received from said multicast source by said PE router with a C-RP behind said PE router, where S is a source of said multicast group;

means for sending a source announcement message by said PE router with a C-RP behind said PE router to indicate said multicast source and a location of said multicast source to all other PE routers in said VPN; and means for signaling an existence of said multicast source and a tunnel identifier to be used for (S,G) multicast traffic to said all other PE routers in said VPN by the PE router with said multicast source behind said PE router when said PE router with said multicast source behind said PE router receives said source announcement message from said PE router with a C-RP behind said PE router.

13. The apparatus of claim 12, wherein said source announcement message comprises a source address of said first multicast packet extracted from said first multicast packet.

14. The apparatus of claim 11, wherein said discovering means further comprises:

means for translating a PIM (*,G) Join message to a PIM (S,G) Join message by each PE router with a multicast group G receiver behind said PE router; and means for sending said PIM (S,G) Join message by said each PE router with a multicast group G receiver behind said PE router to a best next hop router towards said multicast source; and means for joining a tunnel for a (S,G) distribution tree announced by said best next hop router.

* * * * *